April 6, 1926.                                                                                    1,579,922
J. R. GAMMETER
METHOD OF MANUFACTURING TIRES
Filed Nov. 1, 1922                                    3 Sheets-Sheet 3
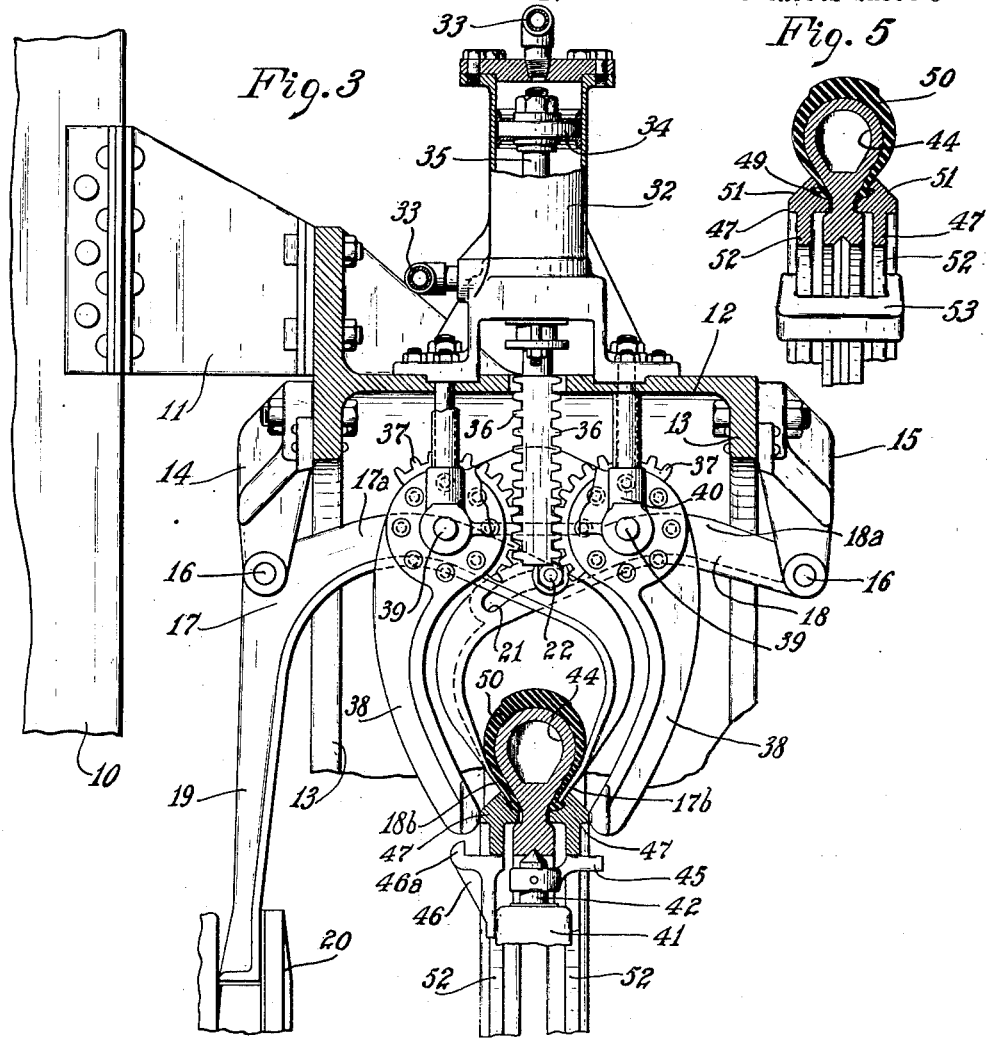
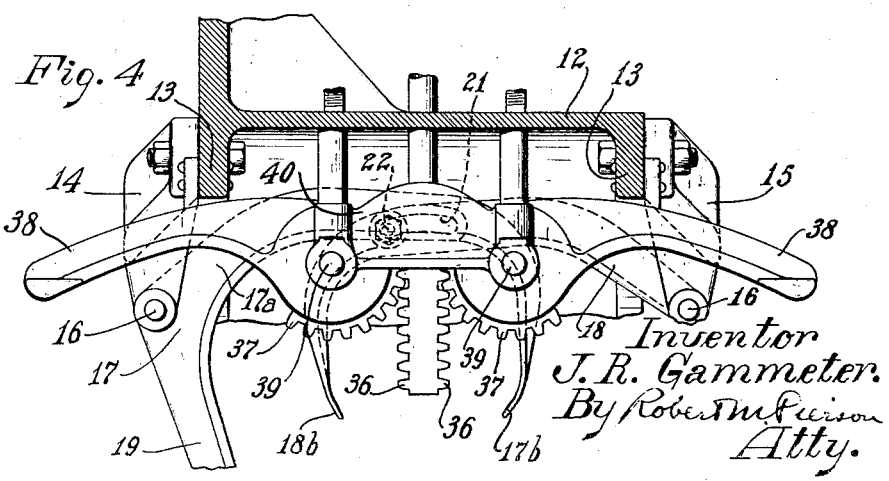
Inventor
J. R. Gammeter.
By Robert McPherson
Atty.

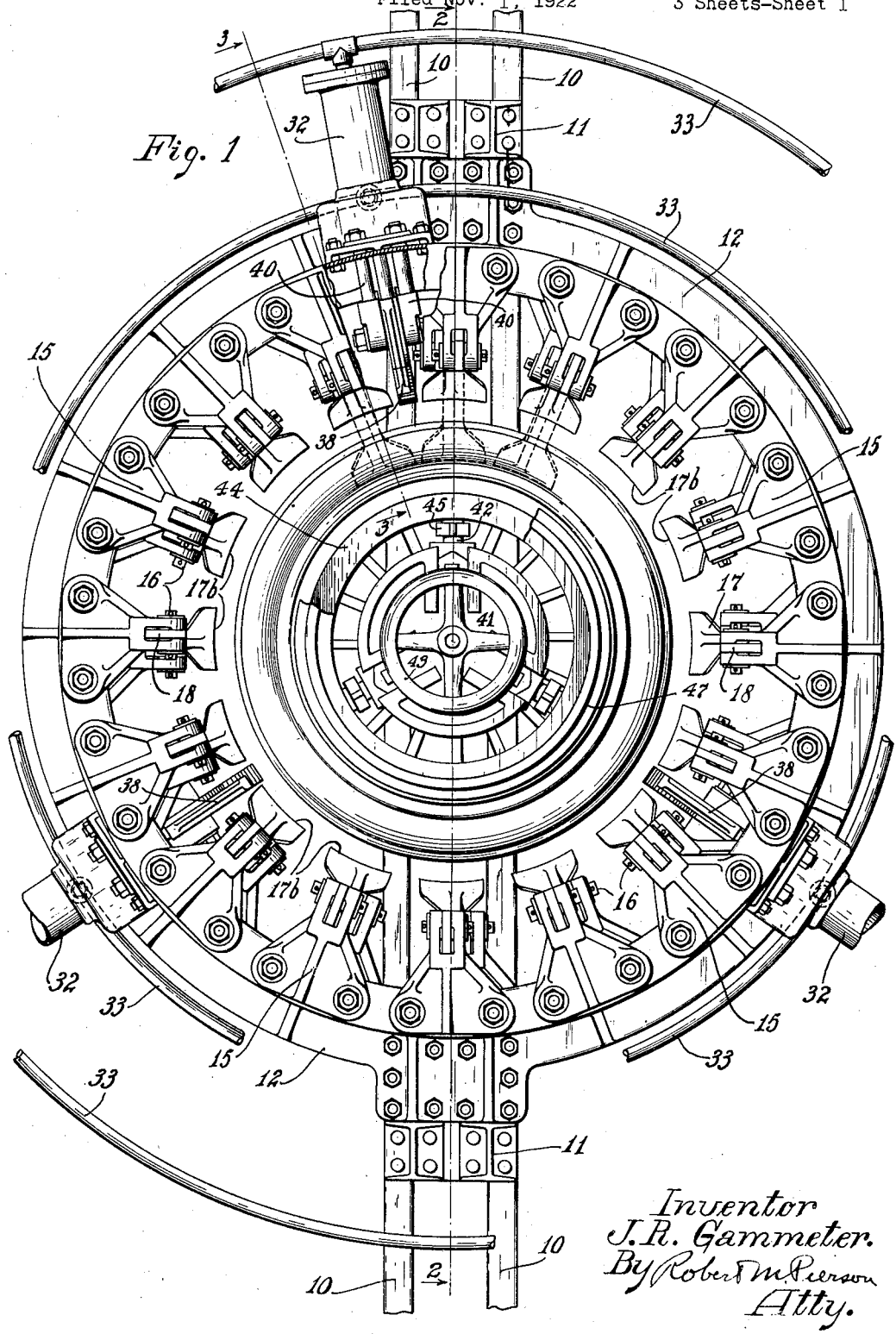

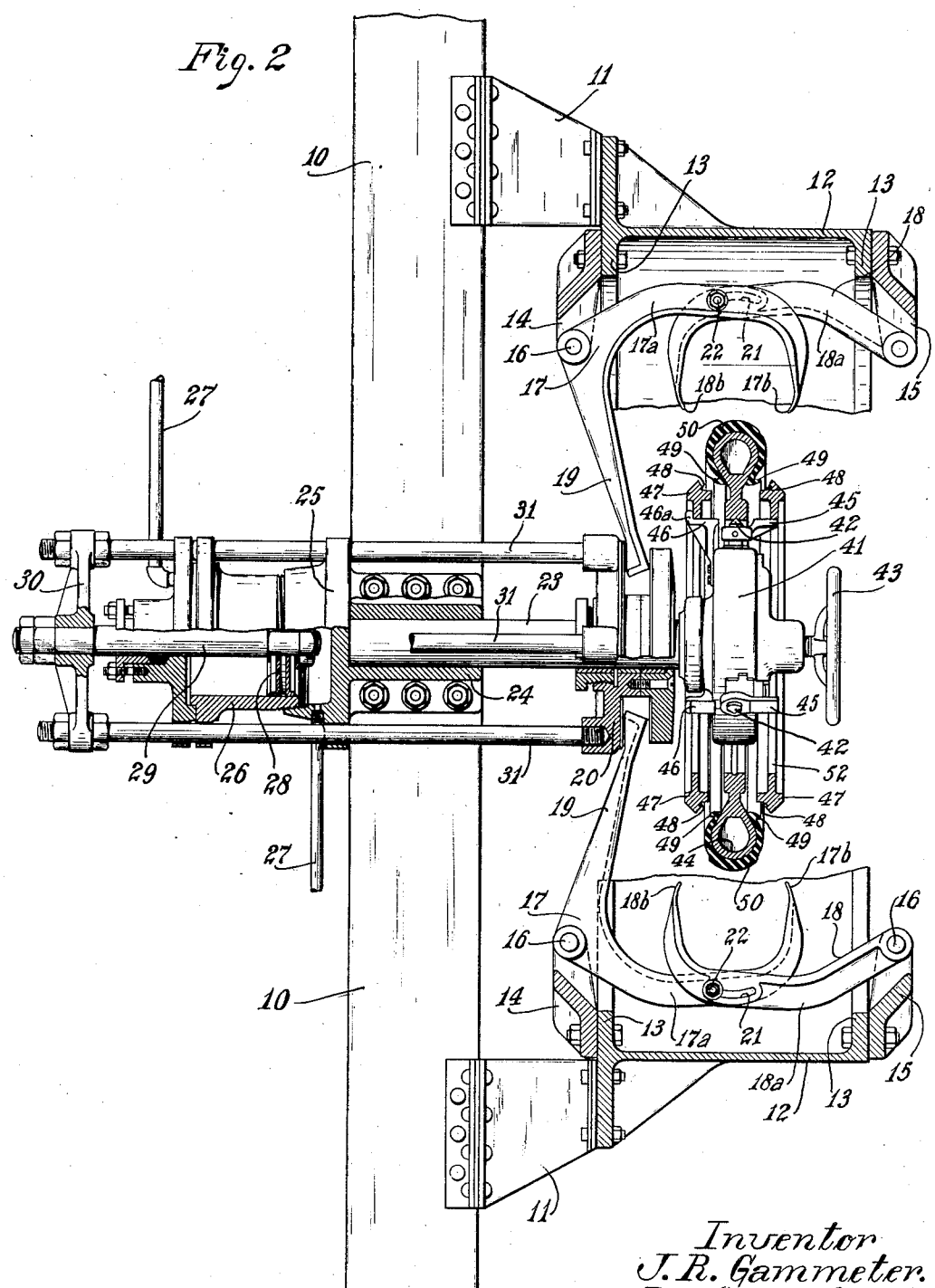

Patented Apr. 6, 1926.

1,579,922

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF MANUFACTURING TIRES.

Application filed November 1, 1922. Serial No. 598,321.

*To all whom it may concern:*

Be it known that I, JOHN R. GAMMETER, a citizen of the United States, residing at Akron, in the county of Summit and State of Ohio, have invented a certain new and useful Method of Manufacturing Tires, of which the following is a specification.

This invention relates to the manufacture of pneumatic vehicle tires having soft or "clincher" type beads. It is particularly applicable to the building of tires wherein weak-wefted cord fabric is used, in which difficulty has heretofore been encountered in obtaining uniform or sufficient tension or stretch in the fabric plies of the tire during the building thereof. In order to insure sufficient stretch in the fabric plies of the finished tires it has been common practice to build the tire on a rigid core, and then to replace said core with an expansible bag and to distend the bag with a fluid to stretch the tire against the walls of the mold in which it is vulcanized.

The chief objects of my invention are to provide an improved method of manufacturing tires whereby the tires may be molded and vulcanized with the fabric thereof under proper tension without removal of the tires from the solid cores on which they were built.

Of the accompanying drawings:

Fig. 1 is a front elevation of apparatus adapted to carry out my invention.

Fig. 2 is a section on the line 2—2 of Fig. 1, showing the tire stretching members in opened-out or inoperative position.

Fig. 3 is a section, on a large scale, on the line 3—3 of Fig. 1, showing the tire stretching members in operative position.

Fig. 4 is a view similar to Fig. 3 showing parts in open or inoperative position.

Fig. 5 is a fragmentary cross-section of a tire, its core, and certain clamping members, after removal from the machine and ready to be assembled with a vulcanizing mold.

Referring to the drawings, 10, 10 are a pair of upright beams, suitably secured to the floor and ceiling, on which are mounted a pair of brackets 11, 11, supporting at top and bottom a large, annular housing 12 mounted in a vertical plane. The lateral edges of the housing 12 are each formed with an inwardly extending circumferential flange, 13, 13, and a set of radial, inwardly extending bearing brackets, 14, 15, are mounted on the rear and front flanges respectively. The inner ends of said brackets are forked and between their forks are hinged, on pivot pins 16, 16, circumferential sets of levers, 17, 17, and 18, 18, respectively, each of the levers 17 being substantially opposite one of the levers 18.

Each of the levers 18 comprises a relatively long and slightly bent portion 18ª adjacent its hinge, and its other end portion is more sharply curved toward the center of the device and terminates in a transversely flattened finger 18ᵇ having an arcuate edge. Each of the levers 17 has a portion 17ª of substantially the same general form as the opposite lever 18, such portion extending from its hinge and crossing said opposite lever 18, and terminating in a flattened finger 17ᵇ. The levers 17, however, are formed with integral arms 19, 19 extending radially inward from their hinges, the inner ends of said arms being flared and engaged at the front and rear by a pair of annular flanges on an axial slide 20, the function and construction of which will be described hereinafter. In each arm 18, where it is crossed by the arm 17, is an arcuate cam slot 21. The shape and position of the slot 21 is such that any movement of the lever 17 will be transmitted to and simultaneously duplicated by the lever 18.

The slide 20 is mounted on a horizontal spindle 23 supported at its rear end in an axial extension 24 projecting from the head 25 of a fluid pressure cylinder 26, said extension being mounted between the beams 10 and constituting the support for the cylinder 26. The cylinder 26 is provided at its opposite ends with fluid supply lines 27, 27 for delivering pressure fluid to opposite sides of its piston 28, said lines being controlled from a common valve (not shown) and adapted to exhaust one end of the cylinder when pressure is admitted to the other end. The piston rod 29 of said cylinder extends from the rear end thereof and is secured at its outer end to a cross-head 30, and a plurality of rods 31, 31 connect said cross-head with the slide 20, to move it backward or forward as the cylinder 26 is actuated.

Mounted on the outer periphery of the cylindrical housing 12 are several (here shown as three) radially disposed, fluid pressure cylinders 32, 32, each cylinder being connected with common pressure-fluid supply lines 33, 33, for delivering pressure-fluid to opposite sides of their pistons 34. Each piston 34 is provided with a piston rod 35 projecting radially inward through the housing 12 between the levers 17, 18, said piston rod having its inner end formed with integral oppositely disposed racks 36, 36, facing front and rear, said racks being meshed with gear segments 37, 37 formed on the hubs of a pair of arcuate levers 38, 38, pivoted at 39, 39 between a pair of brackets 40, 40, said brackets being secured to the housing 12.

Upon the front end of the spindle 23 is mounted a chuck 41 provided with radial arms 42, 42 which are movable radially by means of a hand wheel 43 and adapted to support an annular ring core such as 44 by engagement with a groove in its inner periphery. Secured to each of the arms 42 is a forwardly extending bracket 45, and rearwardly extending brackets 46, 46, provided with outwardly projecting stops 46ª, 46ª, are mounted on the main body of the chuck 41, said brackets serving as supports for a pair of annular bead clamping rings 47, 47, at the front and rear of the ring core 44. The sides of the bed clamping rings facing the ring core 44 are grooved as at 48, 48 to accommodate the beads 49, 49 of an unvulcanized tire casing 50 built on said core, said bead clamping rings also having tapered or inclined faces 51, 51 (Fig. 5) adapted to fit the mold sections subsequently mounted thereon, and inwardly extending flanges 52, 52, said flanges being adapted to seat upon the brackets 45, 46.

The tire 50 is of special construction, being built with beads of greater circumferential length than required in the finished tire, the side walls being correspondingly narrow and the toes of the beads being substantially nearer the crown of the core than they are to be in the finished tire.

In practicing my method with the apparatus herein described, the stretching and clamping arms of the machine being in the positions shown in Figs. 1, 2 and 4, the rear bead clamping ring 47, is placed, from the front, upon the brackets 46, the stops 46ª preventing it from passing off the rear of said brackets; the ring core 44, with the unvulcanized tire 50 thereon, is placed upon the chuck 41 and secured thereon by turning the handwheel 43.

Pressure-fluid is then admitted to the front end of the cylinder 26, forcing its piston 28, the cross-head 30, and the slide 20 rearward, to the left as viewed in Fig. 2. The travel of the slide 20 swings the levers 17 and consequently the levers 18, upon their pivots and causes their fingers 17ᵇ, 18ᵇ, to move in arcuate paths toward the tire 50 until they enter the clinches or grooves of its beads. Continued movement of the fingers forces the beads inward toward the tongue of the core, thus contracting and compressing said beads and stretching the fabric plies of the tire laterally about the core.

While the beads are thus held, pressure-fluid is admitted to the inner ends of the cylinders 32, forcing their pistons 34 and the racks 36 radially outward, thus swinging the levers 38 on their pivots and bringing them into the position shown in Fig. 3, against the bead clamping rings 47, forcing them laterally against the tire and securely clamping its bead portions against the core while the levers 17, 18 hold said beads in contracted position with the fabric of the tire under tension.

Fluid pressure in the cylinder 26 is then reversed, causing the slide 20 to move forward and retract the levers 17, 18, to withdraw their fingers 17ᵇ, 18ᵇ from engagement with the tire beads, the latter being prevented from retracting by the bead clamping rings and the pressure of the levers 38 forcing said bead clamping rings further inward to occupy the space left by the withdrawal of said fingers. The bead clamping rings are then secured in their clamping position upon the tire, as by U-shaped clips 53, 53 (Fig. 5), adapted to engage the flanges 52, 52, after which the fluid pressure in the cylinders 32 is reversed to restore the levers 38 to the inoperative positions shown in Fig. 4. The tire and core with attached bead clamping rings are then removed from the chuck 11 and the tire vulcanized without removal from the core on which it was built, the tire and core preferably being enclosed in a mold during vulcanization.

Modifications may be resorted to without departing from the scope of my invention and I do not wholly limit my claims to the exact procedure herein described. My method may be practiced with various types of apparatus and I do not claim the apparatus herein described as a part of my invention, the same forming the subject matter of the Patent No. 1,526,594, granted February 17, 1925.

I claim:

1. The method of manufacturing tires which comprises building a tire with narrower side walls than are to obtain in the finished tire, stretching said walls to finished position about a core, said stretching step consisting of moving the beads of the tire radially inwardly by the simultaneous application of force at numerous substantially uniformly distributed positions on the beads, and then vulcanizing the tire while its side walls are so stretched.

2. The method of manufacturing tires which comprises building a tire with narrower side walls than are to obtain in the finished tire, stretching said walls to finished position about a core, said stretching step consisting of moving the beads of the tire radially inwardly by the simultaneous application of force at numerous substantially uniformly distributed positions on the beads, holding said beads in their forced positions while mounting the tire in a mold and then vulcanizing the tire while its side walls are so stretched.

3. The method of manufacturing tires which comprises building a tire with its beads outside the ultimate position that is to obtain in the finished tire, forcing said beads to finished position upon a core, said forcing step consisting of moving the beads of the tire radially inwardly by the simultaneous application of force at numerous spaced positions on the beads, and then vulcanizing the tire while the beads are so positioned.

4. The method of manufacturing tires which comprises building a tire with its beads outside the ultimate position that is to obtain in the finished tire, forcing said beads to finished position upon a core, said forcing step consisting of moving the beads of the tire radially inwardly by the simultaneous application of force at numerous spaced positions on the beads, holding the beads in their forced positions while mounting the tire in a mold, and then vulcanizing the tire while the beads are so positioned.

In witness whereof I have hereunto set my hand this 26 day of October, 1922.

JOHN R. GAMMETER.